UNITED STATES PATENT OFFICE.

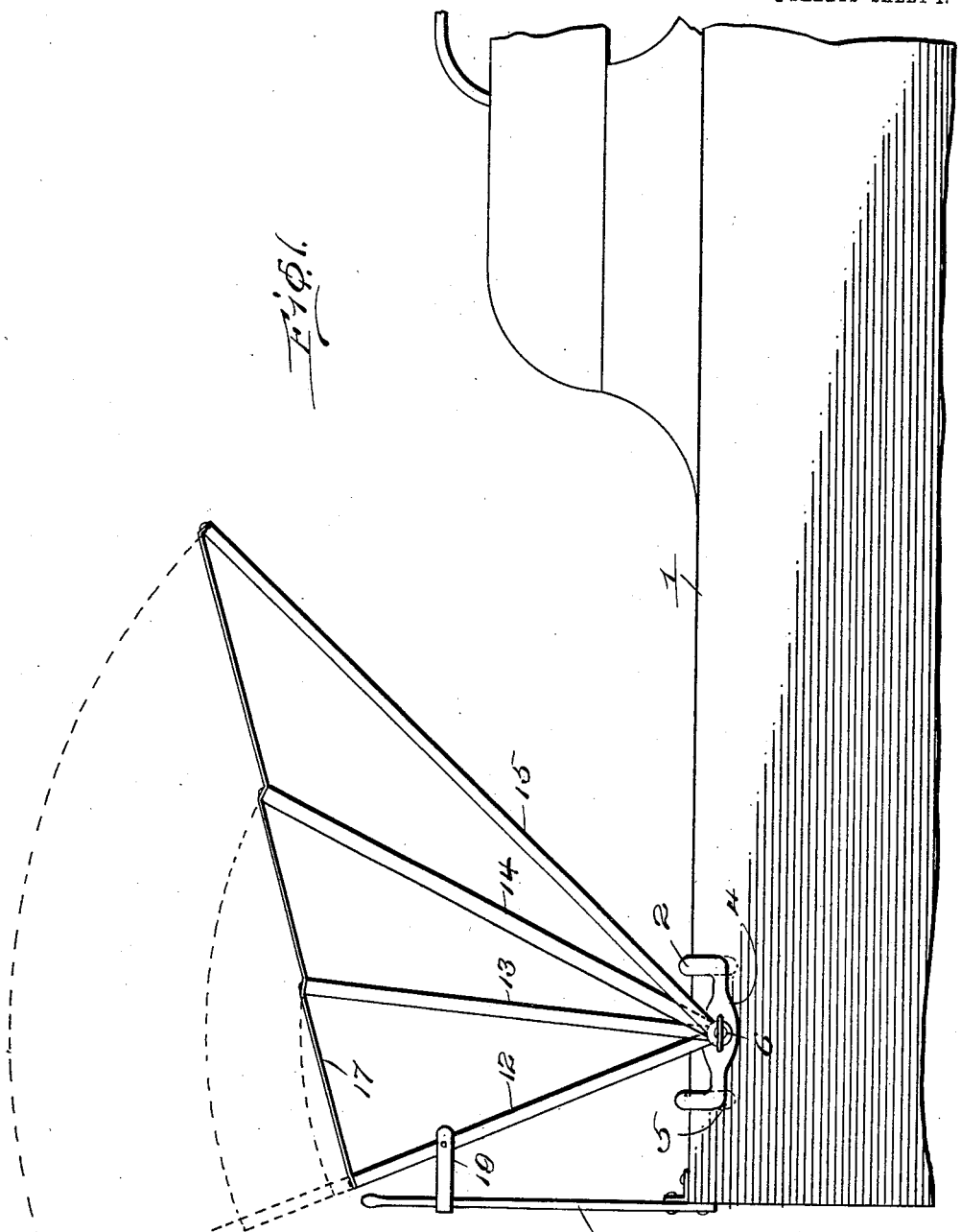

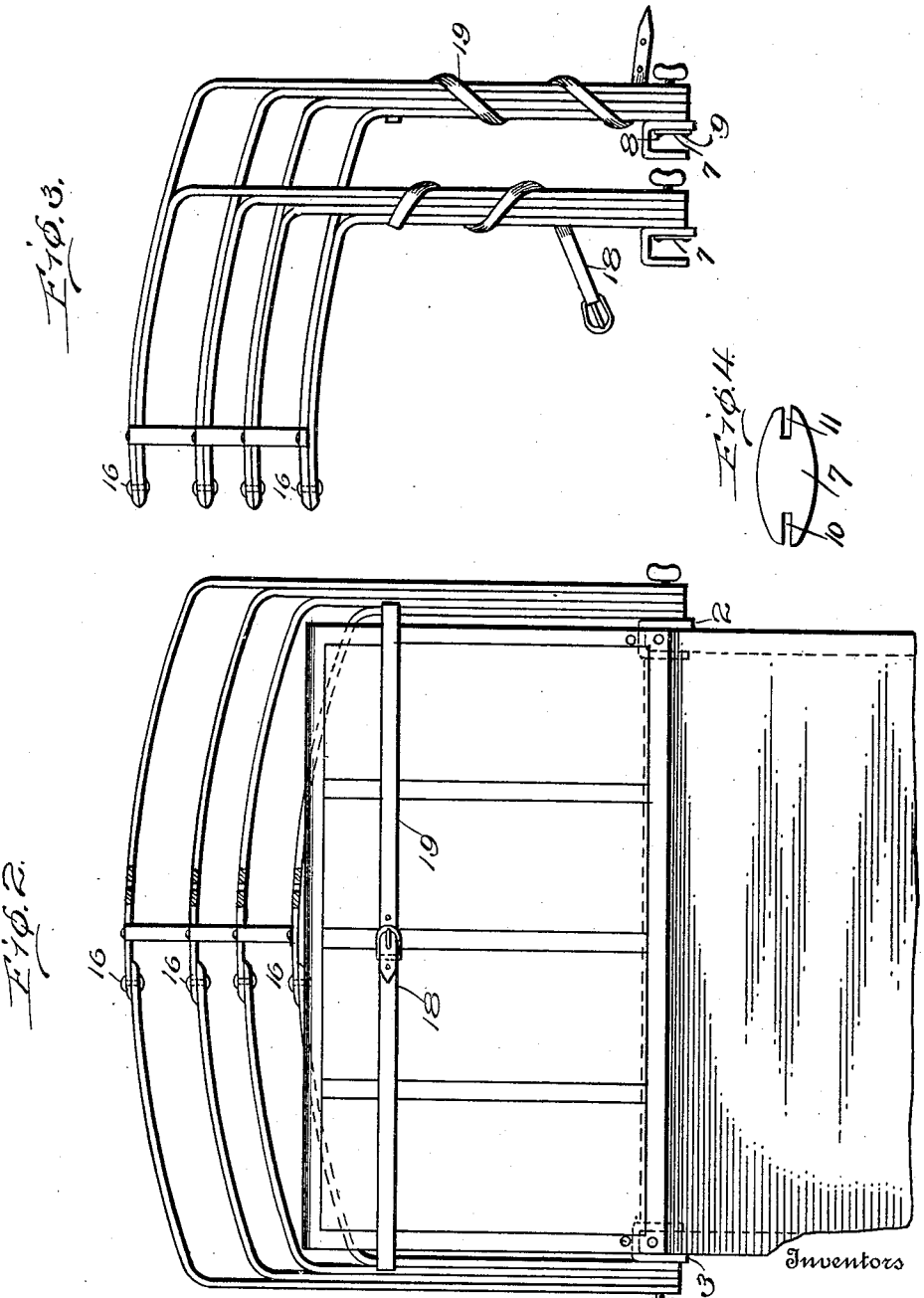

JOSIE BEALE CHANDLER, OF NELSON, VIRGINIA.

STORM-APRON SUPPORT.

1,005,598.  Specification of Letters Patent.  Patented Oct. 10, 1911.

Application filed March 29, 1910. Serial No. 552,184.

*To all whom it may concern:*

Be it known that I, JOSIE BEALE CHANDLER, a citizen of the United States, residing at Nelson, in the county of Mecklenberg and State of Virginia, have invented certain new and useful Improvements in Storm-Apron Supports; and I do hereby declare the following to be a full, clear, and exact description of the invention, such as will enable others skilled in the art to which it appertains to make and use the same.

This invention relates to improvements in storm apron holders, and particularly to holders which may be attached and removed, and also folded whenever desired.

The object in view is the provision of a plurality of folding members adapted to be removably clamped in place on a buggy or other vehicle for supporting a storm apron or covering.

A further object of the invention is the arrangement in an apron holder for vehicles, of a plurality of pivotally mounted members which may be folded for storage, the same being formed with clamping means for engaging the sides of the vehicle, and retaining straps for holding the device against or near the dash-board.

A still further object of the invention is the arrangement of substantially U-shaped supporting members connected together, each of said U-shaped members being limited in its movement by a retaining strap, and all of the U-shaped members being pivotally mounted upon means adapted to be clamped to the sides of the vehicle.

With these and other objects in view the invention comprises certain novel constructions, combinations, and arrangement of parts as will be hereinafter more fully described and claimed.

In the accompanying drawings: Figure 1 is a side view of an embodiment of the invention shown in position. Fig. 2 is a front view of the structure shown in Fig. 1. Fig. 3 is a view of the device in a folded condition. Fig. 4 is a plan view of a spring protecting member.

In forming a device embodying the invention a plurality of substantially U-shaped members are used, the same being of different lengths so that when unfolded and spread for receiving a covering a proper dome-shaped housing will be presented for shielding the feet of the occupants of the vehicle to which the device is secured. These substantially U-shaped members are pivotally mounted upon a pair of supporting brackets which are firmly clamped to the vehicle. Also a pair of retaining straps are provided for binding the front of the device to the dash-board of the vehicle.

In order that the invention may be more clearly understood an embodiment of the same is shown in the accompanying drawings, in which—

1 indicates a vehicle body of any desired kind, upon which are mounted brackets 2 and 3. These clamping brackets are each formed with a body portion 4 and U-shaped hangers 5 for straddling the sides of the vehicle 1. A set screw 6 is provided in each of the brackets 2 and 3, and passed through the body portion 4 and adapted to engage a spring member 7 and force the same against vehicle 1. The spring contact members 7 are each held in place by suitable screws or rivets 8 and 9. The screws or rivets 8 and 9 loosely engage spring members 7 in slots 10 and 11 in order that when set screw 6 presses against the central part of the spring members 7 the same may bow out properly, and permit a proper clamping action, but prevent any scarring of the vehicle body. Pivotally mounted upon the respective set screws 6 are substantially U-shaped supports 12, 13, 14 and 15, the same ranging in size from 12 to 15 in order to properly cover the feet and lower part of passengers in vehicle 1, as more clearly shown in Fig. 1. The supports 12 to 15 inclusive are pivotally connected together by suitable rivets 16 (Fig. 2), so as to permit the same to fold, as more clearly shown in Fig. 3. The supports 12 to 15 may be provided with suitable apertures for permitting the adjustment of rivets 16 for varying widths of vehicles, though for a slight difference in width no adjustment is necessary as the various supports are preferably made from spring metal and will spring sufficiently for taking up any slight variations in width. In order to properly hold the supports spaced apart a retaining and controlling strap 17 is provided which is rigidly secured to each of the supports substantially centrally thereof. Secured to support 12 are straps 18 and 19 which are adapted to be passed around the dash-board 20 of the vehicle 1, and secured together by a suitable buckle for properly holding support 12 in proximity to the dash-board.

After the device has been placed in position upon a vehicle the same may be collapsed, as shown in dotted lines in Fig. 1, or expanded as shown in full lines. When it is not desirable to use the device the same may be quickly removed and folded, as shown in Fig. 3, and stored away in a comparatively small space ready for immediate application whenever desired.

What I claim is:

1. In a device of the character described, a pair of supporting brackets, a plurality of apron supports pivotally connected therewith and arranged one within the other, a member for limiting the movement of the apron supports and means for holding one of said supports in position, such apron supports consisting of a plurality of L shaped sections pivotally connected to form an arched member and arranged to swing upon an axis parallel with those portions of the sections constituting the sides of the arch.

2. In a device of the character described, the combination with a vehicle, of a pair of brackets, a clamping member for clamping said brackets to said vehicle, a protecting member interposed between said vehicle and said clamping member for preventing scarring of said vehicle, and an apron support pivotally connected with said brackets said protecting member comprising a plate provided with slots in each end, and means engaging the slots for holding such plate in position and permitting the movement thereof toward the body to be clamped.

In testimony whereof I affix my signature in presence of two witnesses.

JOSIE BEALE CHANDLER.

Witnesses:
A. H. NELSON,
G. L. RITTARD.

---

Copies of this patent may be obtained for five cents each, by addressing the "Commissioner of Patents, Washington, D. C."